April 6, 1965 J. W. DUDLEY 3,177,492
PULSE INTERVAL INDICATOR
Filed May 6, 1963 2 Sheets-Sheet 1

INVENTOR.
JOHN WESLEY DUDLEY
BY
Reynolds & Christensen
ATTORNEYS

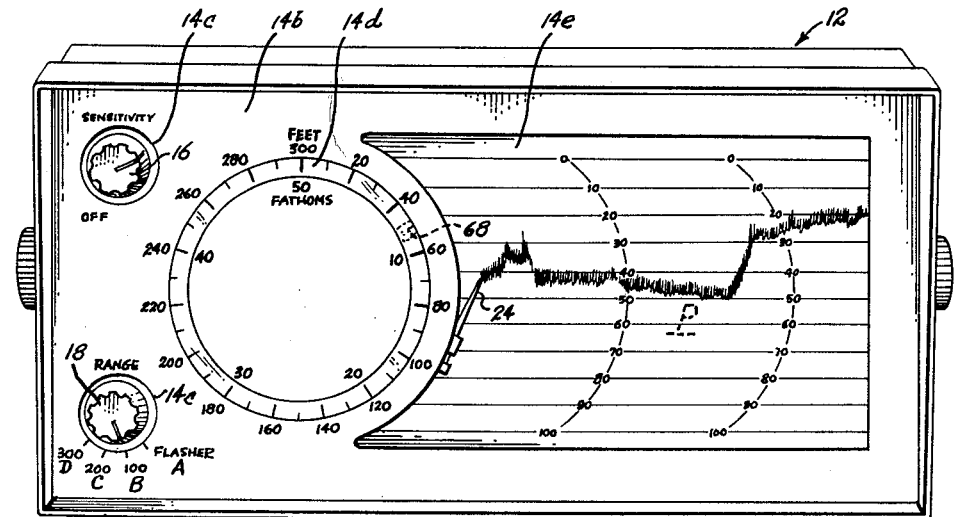
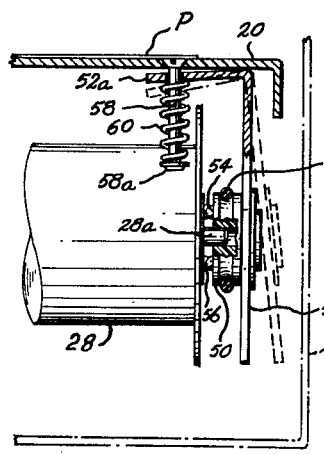
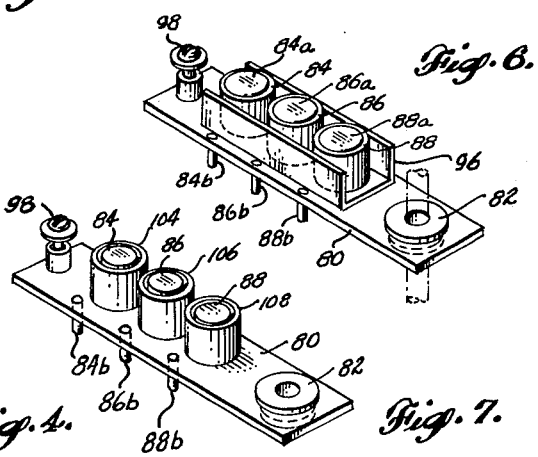
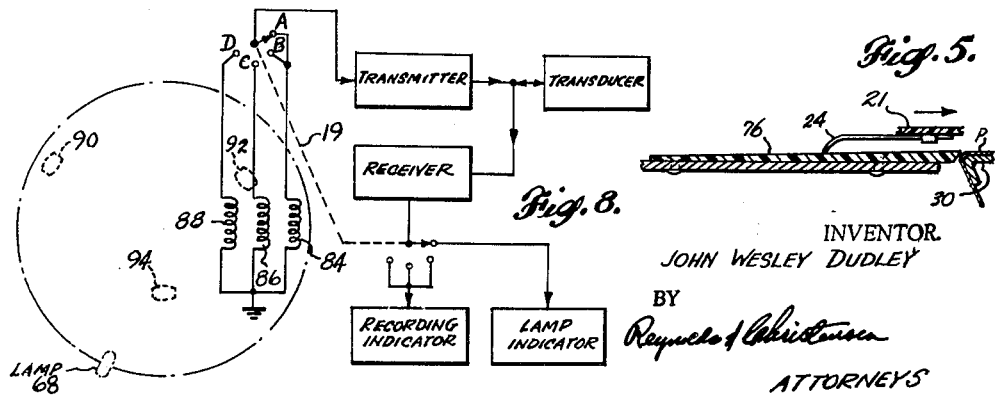

United States Patent Office 3,177,492
Patented Apr. 6, 1965

3,177,492
PULSE INTERVAL INDICATOR
John W. Dudley, Seattle, Wash., assignor to Ross Laboratories, Inc., Seattle, Wash., a corporation of Washington
Filed May 6, 1963, Ser. No. 278,253
11 Claims. (Cl. 346—33)

This invention relates to pulse interval measuring systems, such as pulse-echo type depth sounders, and more particularly concerns recording indicators for initiating and indicating pulse interval in such systems. As herein illustratively described, the invention is embodied in an indicator apparatus combining two types of display, one represented by a point source of light moved cyclicly around a range scale and momentarily energizable by transmitted and received echo pulses, and the other represented by the trace images produced on electrically sensitive moving chart paper by an electrode stylus moved synchronously with the light source to traverse the chart paper transversely to its direction of feed. However, it will be recognized that certain modifications and changes therein with respect to details may be made without departing from the essential features of the invention.

A primary object hereof is to provide improved indicators of the type combining dynamic and recording displays, such as that referred to herein above, and with particular attention to achieving a simple and reliable means for adjustively coordinating the zero settings of the two indicator elements. A related object is to provide improved means to selectively represent in one display (i.e. the recorder) any of different sectors of the total range represented by the other indicator display. A related object is to provide a single adjustment which will coordinate the zero settings of all range sectors of the first-mentioned display and their relation to the zero setting of the second-mentioned total range display.

A further object is to provide an improved and highly compact, yet conveniently accessible, physical arrangement of dynamic and recording type indicators in a common housing. It is also an object to provide an arrangement by which the rotative recording stylus carrier also serves as a carrier for the dynamic indicator (moving light source) and as a carrier for magnetic keying means operable to synchronize operation of the sonar system with movement of the indicator elements.

A related object is to provide such a mechanism in which, by means of external switch means, any of the different range sectors may be selected without necessity for changing carrier rotation speed or phasing and without disturbing any of the zero reference settings of the indicator elements. It is also an object to devise a new and improved magnetic keying apparatus which both eliminates the effects of stray fields on consistency of the phasing or timing of keying impulses generated, and improves the form and definitive shape of such keying impulses.

Still another object is to provide an improved means for supporting and feeding the recording paper, which facilitates removal and placement of storage and take-up spools and which provides automatic protection against application of excessive tension in the recording paper due to the variable peripheral speed of the take-up spool tending to exceed the constant speed of the feed roll, as when the take-up spool approaches maximum accumulation of chart paper thereon.

Yet another object is to provide a simple and effective means to eliminate stylus chatter or fluctuations in stylus pressure on the recording paper due to stylus deflection as it initially encounters the recording paper on each traverse, and to achieve this by compact and inexpensive means which will not create undue stylus wear.

As herein described, the improved indicator comprises a rotor carrying the flashing light and the recording stylus. This same rotor also supports a plurality of permanent magnets in angularly spaced relationship thereon, and at respectively different radii from the rotor axis. Immediately beneath the rotor-supported magnets, are mounted, on a common support arm, a plurality of induction coils corresponding in number and in radial positions to the respective magnets, so as to be traversed cyclically by the individual magnets to induce keying impulses therein as the rotor turns. These coils are individually selectable by an external switch so as to furnish system keying pulses of different phasings, and thereby to permit selecting any of different range sectors for display purposes. The common support arm for the induction coils is angularly adjustable about the axis of the rotor in order to vary the phasing of all magnetic keying impulses equally in relation to rotor position. Thus, any adjustment of arm position effects a like change in phasing of the trigger impulses produced in all of the coils. Independent adjustment of one of the two indicator elements about the rotor circumference provides a means to coordinate the dynamic and recording display zero settings.

The keying stator coil cores, whose salient pole tips are positioned in proximate relation to the rotational paths of the respective trigger magnets, cooperate with ferromagnetic shielding elements having side walls disposed closely adjacent the exterior sides of the respective coils. In one embodiment the shielding means comprises an elongated ferromagnetic channel facing the magnets; in another embodiment the coils are mounted in separate ferromagnetic cups. In either form the shielding means enhance the sharpness of the trigger pulses induced in the coils and prevent stray fields from reaching the coils and disturbing the pulse form, hence the system timing.

The described adjustable-stator magnetic keying arrangement permits maximum overlap of the stylus carrier rotor in relation to the recording paper platform, and thereby maximum utilization of the full width of the recording paper. Such arrangement also permits free tilting of the recording platform about an axis transverse to the rotor axis and offset therefrom in order to afford convenient access to the chart paper rollers.

A low-friction plastic ramp is mounted adjacent the indicator rotor and subtends a small arc thereof in position to be traversed by the recording stylus immediately preceding the latter's approach to the recording paper. The ramp has a surface area substantially flush with that of the recording paper so that any chatter of the stylus is dissipated on the ramp before it reaches the recording paper.

Additional features reside in the novel support and drive coupling for the recording chart take-up roll, including a spring loaded, pivoted journal plate removably supporting one end of the roll and carrying a rotated drive element facing the adjacent end of the roll in coaxial relationship. Mutually interfering protrusions on the drive element and the roll normally transmit torque from the drive element to the roll. By yielding of the plate, these protrusions are permitted to slip past each other in the event the chart paper binds in the mechanism. Similar yielding of the plate to manual force permits release of the take-up roll for removal and replacement.

These and other features, objects and advantages of the invention will become more fully evident from the following description thereof with reference to the accompanying drawings.

FIGURE 3 is a front perspective view of the combined indicator, showing a typical exterior design.

FIGURE 4 is a sectional detail of the releasable take-up roll mount and drive coupling assembly, the view being taken on line 4—4 in FIGURE 1.

FIGURE 5 is a sectional detail taken on line 5—5 in FIGURE 1 showing the stabilizer ramp for the recording stylus.

FIGURE 6 is a perspective detail view of the multicoil stator structure employed in the magnetic keying portion of the system.

FIGURE 7 is a view similar to FIGURE 6 showing a modification.

FIGURE 8 is a simplified circuit diagram showing a simplified sonar and the switching system for selecting the operating mode of the combination indicator.

Figures 1, 2:
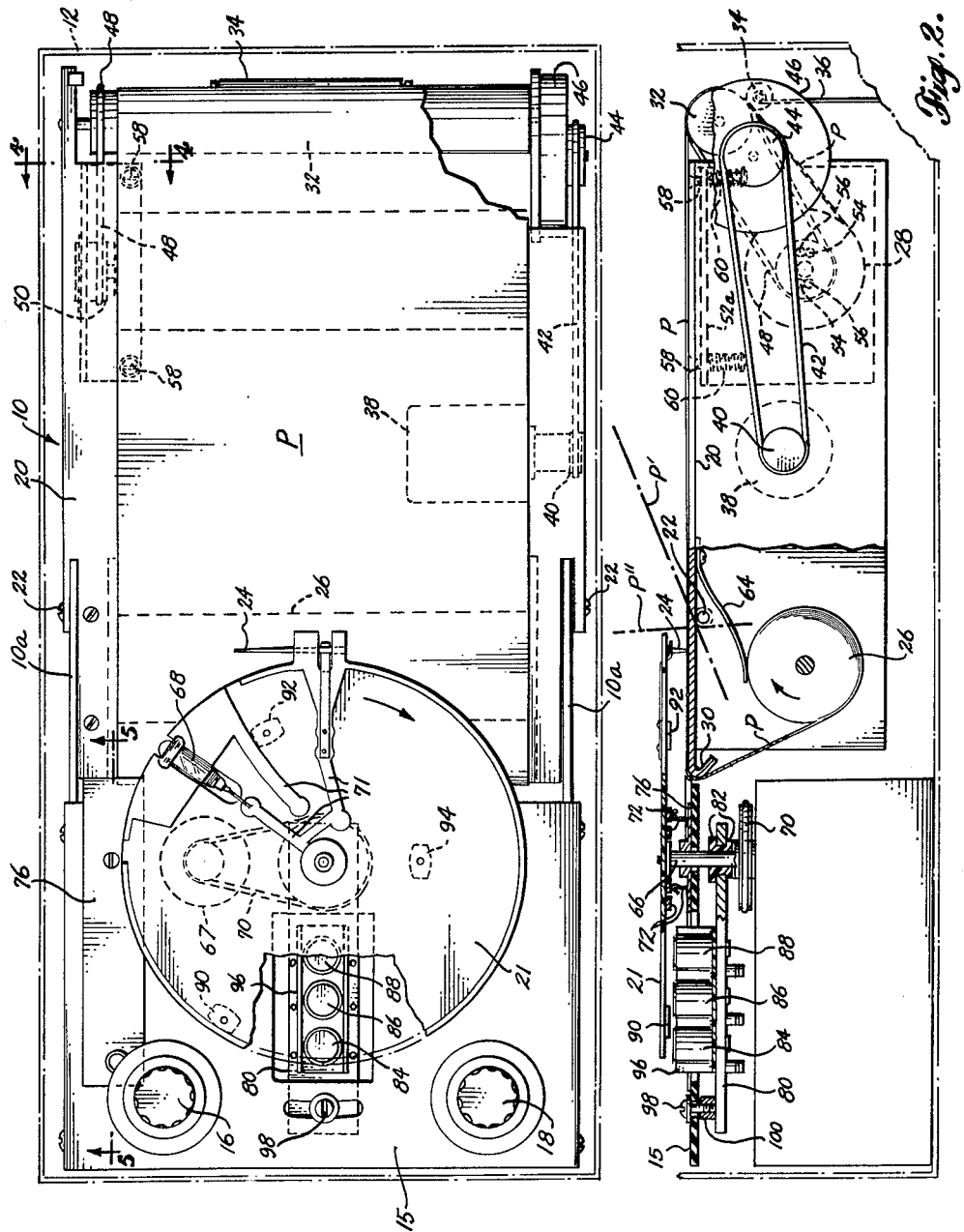
FIGURE 1 is a front view of the improved combined indicator apparatus, with parts broken away to show certain details.
FIGURE 2 is a sectional side view of the apparatus.

Referring to the drawings, the indicator chassis 10 comprises an upwardly open sheet metal channel having opposite side flanges 10a and a connecting bottom adapted to be secured by screws (not shown) within the boxlike casing 12. The casing front 14 comprises a bezel-frame hinged at its lower edge (FIGURE 3) to the casing 12, within which a glass plate 14b is retained overlying the indicator elements to be described. Apertures 14c in the glass plate register with projecting control knobs 16 and 18. Knob 16 controls sonar system receiver sensitivity, and knob 18 controls a range selector switch 19 (FIGURE 8). Portions of the glass cover plate 14b are rendered opaque so as to leave transparent the circular ring area 14d, around which calibrated range scale markings are provided, and the generally rectangular window area 14e through which the markings on the record chart to be described are visible. A point source of light to be described rotates behind the circular ring window 14d in the usual manner to provide flashes of light at the range scale points respectively representing time of transmission and time of echo reception in the total sonar system. The total sonar system itself is not shown in detail in the drawings but may be of any suitable or well known type with which an indicator apparatus of the described type may be used.

Turning now to the interior mounting arrangements, across one end of the chassis 10 there is mounted a support plate 15 parallel to glass cover 14 and serving as a principal support for electronic components of the system as well as for the indicator rotor 21 and its associated components. Overlying essentially the remaining portion of the chassis 10 is a chart platform structure 20 hingedly mounted on pivots 22. The chart platform structure 20 is movable from its normal solid-line position shown in FIGURE 2 wherein its paper-supporting surface disposes recording paper P in the plane of rotation of the recording stylus 24, through a range of upraised positions such as those in which the paper is disposed in the broken line positions P' and P". In the latter, limiting position an operator has direct access to the chart supply and take-up spools beneath the chart platform for purposes of removal and replacement of chart paper. A chart paper supply spool 26 is mounted between the sides of the chart platform structure 20 near the rotor 21 whereas the chart paper take-up spool 28 is mounted near the opposite end of the chart platform structure. Chart paper P leading from the supply spool 26 passes over a guide edge 30 which is located beneath the rotor 21 and which extends in chordwise relationship to the rotor 21. From guide edge 30 the paper P extends across the flat electrically conductive upper surface of the chart platform outwardly from the rotor 21. The paper passes around a driven rubber feed roller 32 and between the surface of this roller and a presser roller 34 mounted on a spring plate 36 urging the roller 34 against the roller 32, thereby to increase the driving traction on the chart paper. Roller 32 is driven by a geared electric motor 38 acting through a pulley 40, rubber belt 42, pulley 44 and gear reduction unit 46. Roller 32 is driven at very slow but constant speed.

Take-up spool 28 is driven at a speed which assures that all paper fed by the feed roller 32 will be wound upon spool 28. It is driven by a belt 48 engaging a sheave 50 (FIGURE 4) journaled in a journal plate 52. An axial pin 28a (FIGURE 3) on the end of the roll 28 is journaled removably in a guide hole formed in drive sheave 50. Convexly rounded protrusions 54 on the face of the sheave interengage with similar protrusions 56 on the adjacent end of the take-up spool 28 in order to provide coupling between the driven sheave and the spool 28. Plate 52 has a turned flange 52a with apertures through which pass the posts 58 projecting from the platform 20. These pins are surrounded by springs 60 reacting between enlargements 58a on the outer ends of the pins and the flange 52a. Thus, the springs tend to maintain the flange 52a in stable contact with the underside of the platform 20 as shown by solid lines in FIGURE 4, while yielding resiliently to permit the plate to be swung outwardly away from the end of the take-up spool 28, such as into the dotted line position. This action permits removing the take-up spool in order to remove or replace chart paper. Moreover, should the peripheral speed of accumulating paper in the take-up roll tend to exceed the feed rate provided by the feed roller 32, or should the chart paper bind in the system, the sheave support plate 52 will yield outwardly in order to permit abutments 54 to pass abutments 56. This safety feature of a slipping clutch prevents tearing of chart paper and damaging of drive connections or parts.

A left spring presser element 64 mounted on the underside of the chart platform 20 acts as a friction brake pressing against the chart paper on the supply roll 26 in order to maintain desired tension in the chart paper as it is drawn slowly over the upper surface of the chart deck beneath the stylus 24.

Rotor 21 comprises a flat disk of electrical insulation material mounted on shaft 66 and driven at constant speed by motor unit 67 through a drive belt 70 and associated pulleys. The disk carries electrode stylus 24 held frictionally in a spring clip 26 which permits circumferential adjustment of the stylus position in relation to the disk for purposes of correcting the zero setting of the stylus in relation to the longitudinal edges of the chart paper P. At a different circumferential location on the disk 21, and at a radial position that places it behind the ring-shaped window 14d, is a small neon bulb 68 serving as a moving point source of light. Suitable printed circuit connections 71 and brush and slip ring means 72 associated therewith provide means to carry currents in the electrical circuits (not shown) which include the stylus 24 and flashing lamp bulb 68. Preferably the angular offset between the stylus tip and the neon bulb 68 is such that the bulb is positioned at the top of the scale (FIGURE 3) just as the stylus tip advances onto the graph paper P during clockwise rotational movement of the rotor. Thus the zero range position of the indicator bulb and the zero range (or minimum range) position of the stylus are made to correspond, and if they do not precisely correspond they may be made to do so simply by a slight circumferential readjustment of the stylus 24 in its friction clip as previously indicated.

In order to stabilize the stylus and prevent its chattering upon initial contact with the graph paper P a low-friction plastic strip or ram 76 is mounted beneath and slightly beyond the edge of the rotor 21 with its top face flush with the top face of the graph paper P and in substantially contiguous relationship to such paper as the paper rounds the guide edge 30. Teflon is a suitable material for the ramp 76 inasmuch as it causes no appreciable wear of the fine tip of the stylus and imposes minimum drag thereon. By the time the stylus has traversed the ramp 76 its vibrations, excited by initial contact with the edge of the ramp, have died out so that, with a smooth transition from the ramp to the graph paper, the stylus exerts steady pressure on the graph paper and avoids any danger of lost echo signal recordings on the graph paper due to unsteadiness of stylus pressure thereon. Yet, during a large fraction of the stylus' revolution it is free of physical contact with any surface. This greatly prolongs the useful life of the stylus.

As a further feature, an insulating arm 80 carried by support 82 for pivoting about the axis of shaft 66, carries a plurality of magnetic triggering field coils, in this case the three coils 84, 86 and 88, respectively. These coils are mounted on the top side of the arm 80 immediately beneath the disk 21. The spaces immediately above the respective coils are swept cyclically by the respective permanent magnets 90, 92 and 94 mounted on the underside of the rotor disk at radial positions corresponding to those of the coils. Each time a magnet passes its associated coil an electrical impulse is induced in the coil and delivered to one of the output terminal posts 84b, 86b or 88b. Such impulse may be used for purposes of triggering the sonar transmitter (not shown) or other pulse interval initiating device. The coils 84, 86 and 88 are mounted in radial alignment on the arm 80 within the space defined by an open-sided ferromagnetic channel member 96. The flanges of this channel extend to a height approximating the height of the coils above the arm 80. The coils have ferromagnetic cores 84a, 86a and 88a respectively which cooperate with the ferromagnetic yoke defined by the channel 96 so as to define a flux path which helps intensify the impulses thus induced in the respective coils when traversed by the associated magnets. In addition, the ferrogagmentic material embodied in the channel flanges acts as a shield for the coils preventing appreciable influence of stray magnetic fields on pulse shape. Thus external magnetic fields, such as those originating in the small electric motors incorporated in the indicator unit or in the circuit leads do not impair consistency of pulse shape nor the phase of transmitter triggering in relation to indicator position.

In FIGURE 7 the channel shaped shielding yoke 96 which is common to all of the coils 84, 86 and 88 is replaced by individual ferromagnetic cups 104, 106, 108 respectively, each cup enclosing one coil on all sides except that which faces the underside of the rotor disk 21.

Angular adjustment of the arm 80 about the axis of shaft 66 is permitted in order to control the phasing of the trigger impulses applied to the system transmitter by the coils 84, 86 and 88 in relation to the angular position of the indicator elements 68 and 24. A lock screw 98 threads into the arm 80, with a clamp bushing 100 interposed between the arm 80 and the rim of the aperture in the chassis plate 15 through which the screw passes. Tightening of the screw thus holds the arm in any assigned position. Because the magnets 90, 92 and 94 and the associated coils 84, 86 and 88 occupy constant angular relationship to each other, any adjustment in the position of the arm has a like effect on the phasing of the impulses generated by all of the coils.

The system includes a range selector switch 19 (FIGURE 8) controlled by knob 18. In the example the selector knob 18 has four distinct settings A, B, C and D, position "A" being designated "Flasher." In this setting the system does not record the echo pulses amplified in the sonar receiver but merely indicates range position of reflecting objects by the positions of light flashes along the range scale of circular window 14d. From these dynamic indications the operator is enabled to choose the range sector of greatest interest and reset the switch 19 so as to record the echo signals occurring in that sector.

In the example mode selector knob 18 turned to either of settings B, C or D selects the range sector from zero to 100 feet, from 100 to 200 feet, or from 200 to 300 feet, respectively, and places the indicator in its recording mode. Thus signal images made by recording stylus 24 sweeping across the graph paper P are positioned in accordance with the ranges of corresponding reflecting objects in the range sector selected.

As will now be evident, selection of range sector is made merely by selecting which of the three trigger coils 84, 86 or 88 will trigger the system transmitter. By positioning these coils in radial alignment, by positioning the magnets 90, 92 and 94 in 120° relationship with each other (approximately, to allow for differences in linear velocity of the magnets at different radii on the disk), and by driving rotor 21 at a prescribed constant speed, switching from one coil to the next advances or retards the phase of the system trigger by certain range increments (assuming that one complete rotation of the indicator rotor corresponds to 300 ft., these increments are 100 ft). Thus, timing of the transmitter operation is varied in relation to the rotation cycle of the recording indicator in order to have the record correspond to the desired range sector.

As will be observed, the physical arrangement of parts in the recording indicator is highly compact, and manufacture of the parts and assemblies thereof is made simple and efficient. The recording chart paper P emerging around the guide edge 30 to the topside of the chart platform 20 does so along a chord of the circle of stylus rotation, which chord is located near the center of the disk, yet this in no way interferes with the mounting and adjustability features of the compact magnetic keying arrangement involving the arm 80 and the associated coils carried thereby. Maximum overlap of the chart deck of unit 10 by the rotor 21 and by the associated dynamic indicator scale 14d is thus permitted as a means to save space, while the recording chart paper P may be of maximum useful width, subtending an arc approximately one-third of the circular path of the recording stylus.

These and other aspects and improvements embodied in the invention will be evident to those skilled in the art from the foregoing disclosure of the presently preferred embodiment.

I claim as my invention:

1. A pulse-echo type propagative wave energy system having an impulse operated transmitter and associated receiver, comprising a rotor, a constant-speed drive for said rotor, a plurality of magnets mounted on said rotor at respectively different radii from the rotational axis thereof, a stationary support for said rotor and drive, a plurality of pickup coils operatively associated with the respective magnets, mounting means for said coils positioning the same adjacent the respective rotational paths of said magnets, whereby time-spaced impulses are induced in the respective coils in a successive order during each cycle of rotation, indicator means including a receiver-energizable rotary element turned synchronously with the rotor, and further including indicator scale means swept cyclically by said element in the interval between successive impulses to indicate by said scale means the time of reception of an echo applied by the receiver to said element, and switch means for selectively connecting individual coils to the transmitter for operating the transmitter at any of different times during the indicator element rotation cycle.

2. A pulse-echo type propagative wave energy system having an impulse operated transmitter and associated receiver, comprising a rotor, a constant-speed drive for said rotor, a plurality of magnets mounted on said rotor at respectively different radii from the rotational axis thereof, a stationary support for said rotor and drive, a plurality of pickup coils operatively associated with the respective magnets, mounting means for said coils positioning the same adjacent the respective rotational paths of said magnets, whereby time-spaced impulses are induced in the respective coils in a successive order during each cycle of rotation, indicator means including a receiver-energizable rotary stylus element turned synchronously with the rotor, and further including record chart means swept cyclically by said element in the interval between successive impulses thereon to indicate on said chart means the time of reception of an echo applied by the receiver to said element, and switch means for selectively connecting individual coils to the transmitter for operating the transmitter at any of different times during the indicator element rotation cycle.

3. The system defined in claim 2, wherein the rotor comprises a disk-like member carrying the stylus element and the magnets at respective locations spaced angularly about the rotational axis thereof, and the mounting means for the coils comprises a stationary carrier supporting such coils substantially in alignment radial to such axis, and means to adjust the angular position of the carrier about said axis so as to vary the phasing of the impulses relative to said sweep by the indicator element.

4. The system defined in claim 3, wherein the chart means includes a rolled chart and guide means arranged to lead the chart progressively with time in a path directed radially outward from the vicinity of said axis in a plane generally parallel to the rotational path of the indicator element.

5. The system defined in claim 4, further comprising a visible second receiver-energizable indicator element carried by the rotor, stationary scale means cooperating with said second indicator element and having a scale extending along the rotational path of the second indicator element over a distance corresponding to a plurality of the successive intervals between impulses.

6. The system defined in claim 5, and means operatively associated with one indicator element to permit relatively adjusting the angular position thereof relative to its co-operating scale independently of the adjusted position of the carrier.

7. The system defined in claim 5, and selector switch means operable to connect the individual indicator elements alternatively to the receiver.

8. The system defined in claim 2, further comprising a visible second receiver-energizable indicator element carried by the rotor, stationary scale means cooperating with said second indicator element and having a scale extending along the rotational path of the second indicator element over a distance corresponding to a plurality of the successive intervals between impulses.

9. A pulse-echo type propagative wave energy system having an impulse operated transmitter and associated receiver, comprising a disk-like rotor, a constant-speed drive for said rotor, a plurality of magnets mounted on said rotor at respectively different radii from the rotational axis thereof and at respective locations spaced angularly about said axis, a stationary support for said rotor and drive, a plurality of pickup coils operatively associated with the respective magnets, mounting means for said coils, including a carrier positioning the coils in alignment radial to said axis and with individual coils adjacent the respective rotational paths of said magnets, whereby time-spaced impulses are induced in the respective coils in a successive order during each cycle of rotation, means to adjust the angular position of the carrier about said axis so as to vary the phasing of the impulses relative to the rotor's position, indicator means including a receiver-energizable rotary element turned synchronously with the rotor, and further including indicator scale means swept cyclically by said element in the interval between successive impulses to indicate by said scale means the time of reception of an echo applied by the receiver to said element, and switch means for selectively connecting individual coils to the transmitter for operating the transmitter at any of different times during the indicator element rotation cycle.

10. The system defined in claim 9, and two separate indicator elements carried by the rotor, one such indicator element being adjustable in its angular position about the rotor's axis, and two separate stationary indicator scale devices cooperating with the separate indicator elements, respectively, one such scale device subtending a fraction of a revolution of the rotor, and the other scale device subtending a greater portion of a revolution.

11. The system defined in claim 9, wherein the carrier comprises an elongated channel of ferromagnetic material open on a side facing the rotor, and thereby the magnets, and the coils are mounted within the channel with their respective axes directed transversely toward the rotor.

References Cited by the Examiner
UNITED STATES PATENTS

| | | | |
|---|---|---|---|
| 2,274,608 | 2/42 | Cooke | 226—188 |
| 2,551,707 | 5/51 | Schnee | 226—188 |
| 2,561,345 | 7/51 | Deloraine | 346—33 |
| 2,883,642 | 4/59 | Kietz | 340—3 |
| 2,895,784 | 7/59 | Rocha | 346—33 |
| 3,072,813 | 1/63 | Reijnst et al. | 310—156 |
| 3,076,173 | 1/63 | Richter | 340—3 |
| 3,078,381 | 2/63 | Volkrodt | 310—156 |
| 3,083,311 | 3/63 | Krasnow | 310—156 |
| 3,122,719 | 2/64 | Grieg | 340—1 |

LEYLAND M. MARTIN, *Primary Examiner.*